(12) United States Patent
Yi et al.

(10) Patent No.: US 8,692,785 B2
(45) Date of Patent: Apr. 8, 2014

(54) METHOD AND SYSTEM FOR DETECTING ONE OR MORE OBJECTS

(75) Inventors: Lianfang Yi, Guangdong (CN); Tiejun Cai, Shenzhen (CN); Bangjun He, Shenzhen (CN); Yun Yang, Shenzhen (CN)

(73) Assignee: BYD Company Limited, Shenzhen, Guangdong (CN)

( * ) Notice: Subject to any disclaimer, the term of this patent is extended or adjusted under 35 U.S.C. 154(b) by 221 days.

(21) Appl. No.: 12/979,581

(22) Filed: Dec. 28, 2010

(65) Prior Publication Data

US 2012/0075234 A1    Mar. 29, 2012

(30) Foreign Application Priority Data

Sep. 29, 2010 (CN) .......................... 2010 1 0295805

(51) Int. Cl.
*G06F 3/046* (2006.01)
(52) U.S. Cl.
USPC ....................................... 345/173; 178/18.07
(58) Field of Classification Search
USPC ............... 345/173–179; 178/18.01–18.11
See application file for complete search history.

(56) References Cited

U.S. PATENT DOCUMENTS

| | | | | |
|---|---|---|---|---|
| 5,825,352 A * | 10/1998 | Bisset et al. | | 345/173 |
| 5,986,224 A * | 11/1999 | Kent | | 178/18.04 |
| 7,786,980 B2 * | 8/2010 | Lashina | | 345/173 |
| 2003/0063073 A1 * | 4/2003 | Geaghan et al. | | 345/173 |
| 2006/0139340 A1 * | 6/2006 | Geaghan | | 345/177 |
| 2006/0267953 A1 * | 11/2006 | Peterson et al. | | 345/173 |
| 2007/0236478 A1 * | 10/2007 | Geaghan et al. | | 345/173 |
| 2009/0184934 A1 * | 7/2009 | Lin et al. | | 345/173 |
| 2009/0245574 A1 * | 10/2009 | Ahn et al. | | 382/103 |
| 2010/0097329 A1 * | 4/2010 | Simmons et al. | | 345/173 |
| 2010/0194713 A1 * | 8/2010 | Kawashima et al. | | 345/175 |
| 2010/0231555 A1 | 9/2010 | Mackey | | |
| 2011/0059778 A1 * | 3/2011 | Barras et al. | | 455/566 |
| 2011/0074719 A1 * | 3/2011 | Yeh et al. | | 345/173 |
| 2011/0102339 A1 * | 5/2011 | Lin et al. | | 345/173 |
| 2011/0291944 A1 * | 12/2011 | Simmons et al. | | 345/173 |

FOREIGN PATENT DOCUMENTS

| | | |
|---|---|---|
| CN | 1797308 A | 7/2006 |
| CN | 100377055 C | 3/2008 |
| CN | 101488068 A | 7/2009 |

OTHER PUBLICATIONS

International Search Report PCT/CN2011/076535.

* cited by examiner

*Primary Examiner* — Dmitriy Bolotin
(74) *Attorney, Agent, or Firm* — Troutman Sanders LLP

(57) ABSTRACT

A method for detecting one or more objects is disclosed. In one embodiment, the method comprises the steps of: receiving one or more induction signals caused by at least one object along one or more directions; comparing each received induction signal with a reference to detect at least one upward trend and/or at least one downward trend in the induction signal; and determining the number of objects based on the number of upward trend and/or downward trend in each received induction signal. A device for detecting one or more objects on a touch device is also disclosed.

25 Claims, 4 Drawing Sheets

METHOD AND SYSTEM FOR DETECTING ONE OR MORE OBJECTS

CROSS-REFERENCE TO RELATED APPLICATION

This application claims foreign priority benefits under 35 U.S.C. §119 from Chinese Patent Application Serial No. 201010295805.5, filed on Sep. 29, 2010, the content of which is incorporated herein by reference in its entirety.

FIELD OF THE INVENTION

Exemplary embodiments of the present invention relate to a method and system for detecting one or more objects. In particular, these embodiments relate to a method and system for detecting one or more objects for touch devices.

BACKGROUND OF THE RELATED ART

Nowadays, great changes have taken place in electronic products because of the rapid development of technology. Touch electronic products become more and more popular ever since they appeared in the market. Touch electronic products save space and are easy to carry. Further more, touch electronic products are comfortable and convenient to use, because they can be directly operated by using a finger or a touch pen. Popular products such as PDAs, touch mobile phones, portable computers and so on are increasingly relying on touch technology, and it is apparent that touch electronic devices will be widely applied in many fields.

Because capacitive touch devices can stand wear and tear, enjoy long life and have advantages in system function and in reducing light losses, they are being well-accepted by the market and many kinds of capacitive touch devices have been created.

The operation principle of a capacitive touch device is to use a controller chip to sense changes in capacitance in the capacitors of the touch panel and determine the position and the gesture of the touch object, such as a finger. During the touch sensing process, the horizontal electrode array and the vertical electrode array of the touch panel are detected separately, and horizontal coordinates and vertical coordinates are determined according to the change in capacitance before and after the occurrence of a touch. Then, the horizontal and vertical coordinates are combined to form coordinates of the XY plane. The detecting method above is in fact equivalent to first projecting the touch points on the touch panel on the X-axis and the Y-axis respectively, then calculating the coordinates in the X direction and Y direction, and finally combining these X and Y coordinates to form the touch points' coordinates in the XY plane. This detecting method, unfortunately, can only detect a single object and cannot achieve the detection of multiple objects on the touch device.

SUMMARY OF THE INVENTION

In one exemplary embodiment of the invention, a method for detecting one or more objects is provided. The method comprises: receiving one or more induction signals caused by at least one object along one or more directions; comparing each received induction signal with a reference to detect at least one upward trend and/or at least one downward trend in the induction signal; and determining the number of objects based on the number of the upward trend and/or the downward trend in each received induction signal.

In another exemplary embodiment of the invention, a method for detecting object on a touch device is provided. The method comprises: receiving one or more induction signals caused by at least one object along one or more directions on the touch panel of the touch device; comparing each received induction signal with a reference to detect at least one upward trend and/or at least one downward trend in the induction signal; and determining the number of objects based on the number of the upward trend and/or the downward trend in each received induction signal.

In yet another exemplary embodiment of the invention, a device for detecting object on a touch device is provided. The device comprises: a detecting module, configured to detecte one or more induction signals caused by at least one object along one or more directions on the touch panel of the touch device; and a calculating module, configured to receive the induction signal and compare each received induction signal with a reference to detect at least one upward trend and/or at least one downward trend in the induction signal and determine the number of objects based on the number of the upward trend and/or the downward trend in each received induction signal.

BRIEF DESCRIPTION OF THE DRAWINGS

The foregoing summary, as well as the following detailed description of the invention, will be better understood when read in conjunction with the appended drawings. The embodiments illustrated in the figures of the accompanying drawings herein are by way of example and not by way of limitation. In the drawings.

DETAILED DESCRIPTION

Figure 1:
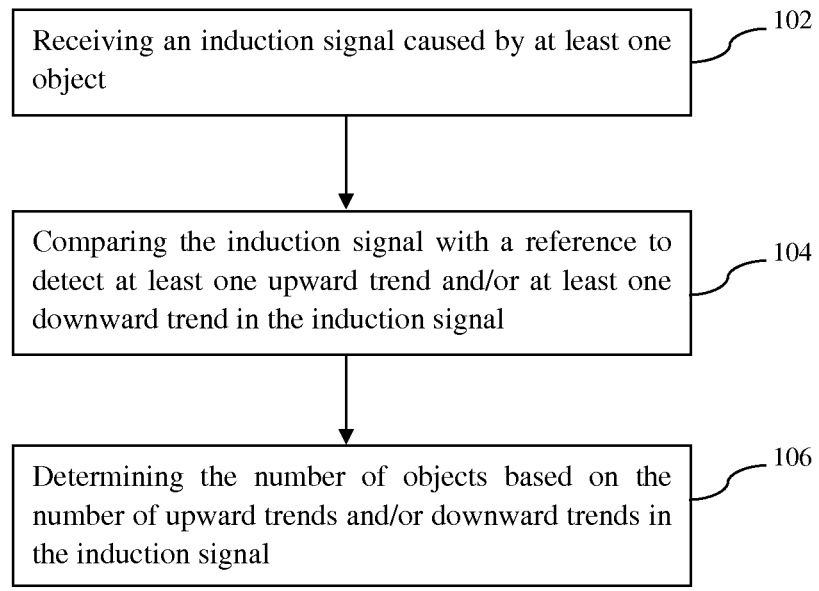
FIG. 1 illustrates a flow chart of detecting one or more objects according to one exemplary embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Reference in the specification to "one exemplary embodiment" "this exemplary embodiment" or "a circumstance" means that a particular feature, structure, or characteristic described in connection with the embodiment is included in at least one embodiment of the present invention. The appearances of the phrase "in one exemplary embodiment" or "in a circumstance" in various places throughout this specification are not necessarily all referring to the same embodiment. Furthermore, the particular features, structures, or characteristics may be combined in any suitable manner in one or more embodiments.

In the description of the invention, the locations or relative positions referred to by the terms "inside" "outside", "vertical", "horizontal", "up", "down", "top", "bottom" are based on the locations or relative positions shown in the drawings. They are only used to facilitate the description of the invention, and they should not be used to require that the invention must be constructed or operated according to a specific position, neither can they be interpreted as restrictions to the present invention.

Referring to FIG. 1, in one exemplary embodiment, the method for detecting one or more objects comprises the following steps: in step 102, receiving an induction signal caused by a least one object along at least one direction; in step 104, comparing the induction signal with a reference signal to detect at least one upward trend and/or at least one downward trend in the induction signal; and in step 106, determining the number of objects causing the induction based on the number of the upward trend and/or the downward trend in the induction signal.

Please note that the induction signal may be caused by a physical touch, acoustic induction, electric induction or image projection. Moreover, the induction signal may be obtained through a optical sensor or a electric sensor. All of the variations above fall into the scope of this invention.

The step 102 above may further include receiving a first induction signal along a first direction and receiving a second induction signal along a second direction.

Please note that although some touch devices will be used in the description below as examples to apply the detection method and system of this invention, the scope of this invention shall not be limited to those touch devices. It is apparent that people of ordinary skills in art, after reviewing the description of this invention, may apply or combine the detection method and system of this invention with other methods or devices. Those other methods or device should still fall within the scope of this invention.

In one exemplary embodiment, a method for detecting one or more objects on a touch device is provided. The method comprises: receiving an induction signal caused by a least one object along at least one direction from the touch device; comparing the induction signal with a reference signal to detect at least one upward trend and/or at least one downward trend in the induction signal; and determining the number of objects causing the induction based on the number of upward trend and/or downward trend in the induction signal.

In some circumstances, the step of receiving an induction signal further comprises: receiving a first induction signal from a first direction of the touch device; and receiving a second induction signal from a second direction of the touch device.

Figure 2:
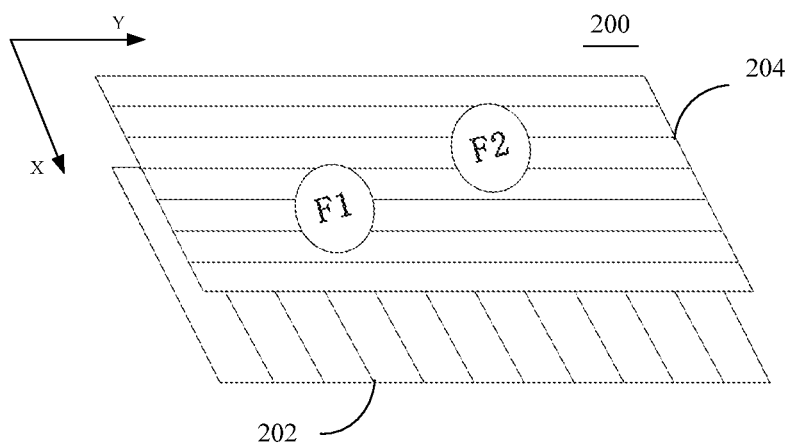
FIG. 2 illustrates a schematic diagram of the induction line of the touch device according to one exemplary embodiment of the present invention.

Referring to FIG. 2, FIG. 2 illustrates a schematic diagram of the induction lines on the touch device. The touch device 200 comprises a plurality of induction lines 202 disposed in a first direction and a plurality of induction lines 204 disposed in a second direction. In some circumstances, there is an angle between the induction lines in the first direction and the induction lines in the second direction. In some circumstance, the induction lines 202 are disposed in the X direction and the induction lines 204 are disposed in the Y direction and the angle between lines 202 and lines 204 is 90 degree.

Please note that the induction lines above are just one form of exemplary devices used to receive induction signals caused by objects on a touch device. Other sensor devices, such as acoustic sensors or light sensors can also be used to receive induction signals and all of these sensor devices fall within the scope of this invention.

In some exemplary embodiments, an upward trend means a signal portion where the signal value increases from a value less than a reference value to a value greater than the reference value. And a downward trend means a signal portion where the signal value decreases from a value greater than a reference value to a value less than the reference value. Both the induction signal and the reference signal may be of any signal form or shape. In one embodiment, the reference signal is a horizontal line, but people of ordinary skill in the art may adopt any form of reference signal in their practices and any of these reference signals should fall within the scope of this invention.

Referring back to FIG. 2, when detecting an object on a touch device, the method according to one embodiment of this invention first receives a first induction signal in the X direction, compares the first induction signal with a reference signal to detect the number of upward and/or downward trends in the X direction, and determine the number of touch objects in the X direction based on the number of upward and/or downward trends in the X direction. Then, the method receives a second induction signal in the Y direction, compares the second induction signal with a reference signal to detect the number of upward and/or downward trends in the Y direction, and determine the number of touch objects in the Y direction based on the number of upward and/or downward trends in the Y direction.

Optionally, the number of touch objects in the X direction is compared with the number of touch objects in the Y direction, and the larger number is chosen to be the actual number of objects that have touched upon the touch device. Moreover, in order to improve accuracy, more induction signals may be received from more directions (for example, 3, 4 or 5 directions), and this also falls within the scope of this invention.

Figure 3:
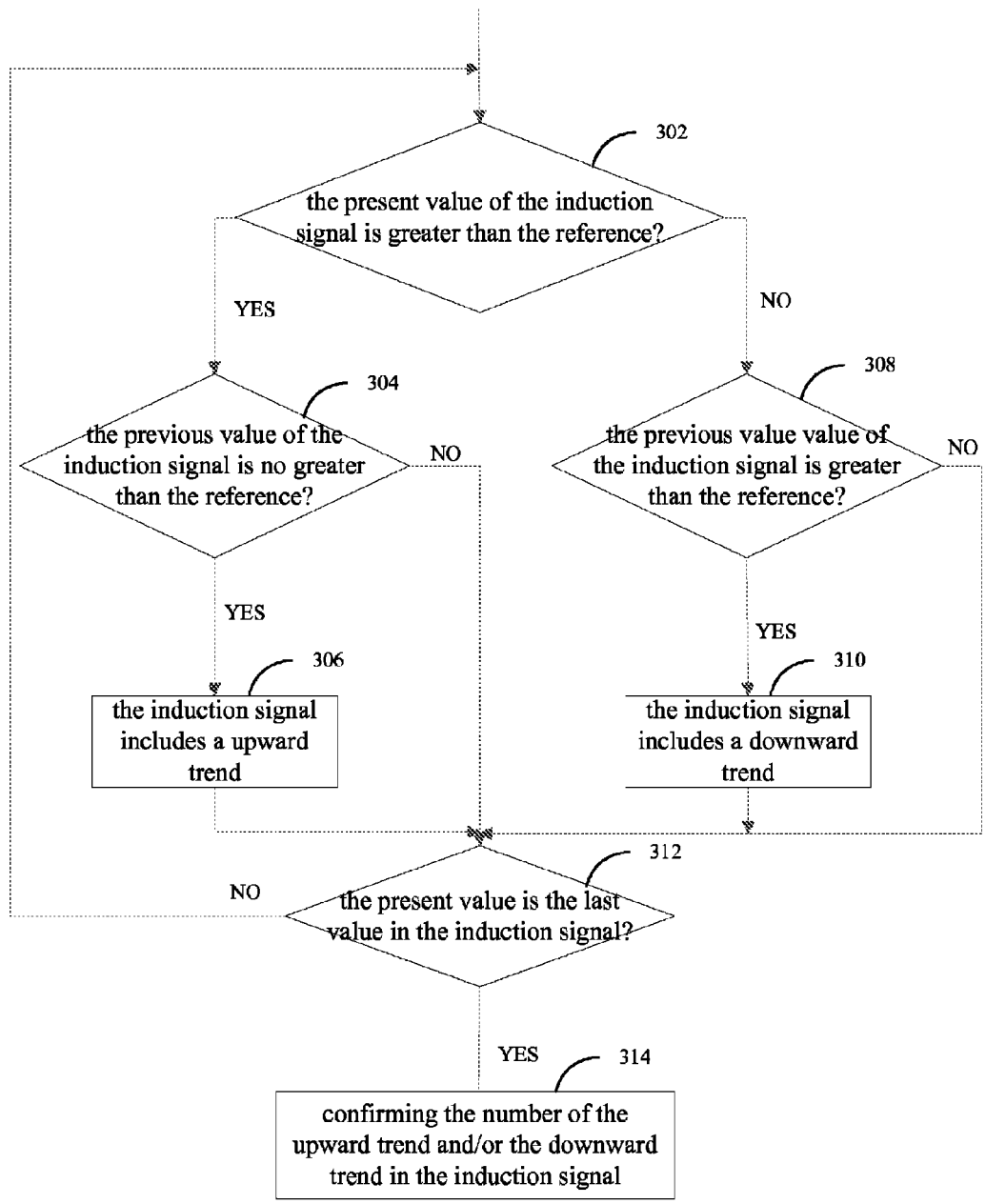
FIG. 3 illustrates a flow chart of a part of a method for detecting one or more objects according to one exemplary embodiment of the present invention.

FIG. 3 shows a flow chart of the step of comparing the induction signal with a reference signal to detect at least one upward trend and/or at least one downward trend in the induction signal according to one exemplary embodiment of this invention According to the flow chart, this comparing step further comprises the following steps:

in step 302, the present value of the induction signal is compared with the reference signal to determine whether the present value of the induction signal is greater than the reference, if YES, the process goes to step 304, if NO, the process goes to step 308;

in step 304, the previous value of the induction signal is compared with the reference to determine whether the previous value of the induction signal is no greater than the reference, if YES, the process goes to step 306, which determines that the induction signal includes a upward trend and then move to step 312, if NO, the process directly goes to step 312;

in step 308, the previous value of the induction signal is compared with the reference to determine whether the previous value of the induction signal is greater than the reference, if YES, the process goes to step 310, which determines that the induction signal includes a downward trend and then move to step 312, if NO, the process directly goes to step 312;

step 312 determines whether the present value is the last value in the induction signal, if YES, the process goes to step 314, which determines the number of upward trend and/or downward trend in the induction signal, if NO, the process goes back to step 302.

In one exemplary embodiment, the comparing step described in step 104 of FIG. 1 above may further comprise the following steps: setting a first induction value; comparing the initial value of the induction signal with the reference; comparing the first induction value with the reference; and determine whether the induction signal includes a upward or downward trend based on the results of the two comparing steps. The first induction value is set according to the direction of the induction signal. For example, in FIG. 4 the direction of the induction signal is upward and in FIG. 5 the direction of the induction signal is downward. In this exemplary embodiment, if the the direction of the induction signal is upward, the first induction value is set less than the reference; if the the direction of the induction signal is downward, the first induction value is set larger than the reference.

In another exemplary embodiment, the comparing step described in step 104 of FIG. 1 above may further comprise the following steps: setting a second induction value; comparing the last value of the induction signal with the reference; comparing the second induction value with the reference; and determine whether the induction signal includes a upward or downward trend based on the results of the two comparing steps. The second induction value is set according to the direction of the induction signal. In this exemplary embodiment, if the direction of the induction signal is upward, the second induction value is set less than the reference; if the the direction of the induction signal is downward, the second induction value is set larger than the reference.

By setting a first induction value before the initial value and a second induction value after the last value of the induction signal, the situation where the initial value or the last value has no previous value to compare to determine the existence of an upward or downward trend may be avoided. Moreover, the introduction of the first and second induction values may result in an equal number of upward and downward trends. Thus, either the number of upward trends or the number of downward trends may be used as the number of objects that cause the induction.

In one exemplary embodiment, if the amount of the upward trend is not equal to the amount of the downward trend, then the method executes the steps again starting from step 102.

In one exemplary embodiment, the method further comprises: comparing the distance between a point where the induction signal crosses the reference in an upward trend and the immediate next point where the induction signal crosses the reference in a downward trend, and verifying the existence of the object causing the induction by determining if the distance is greater than a threshold value.

Similarly, the method may further comprise: comparing the distance between a point where the induction signal crosses the reference in a downward trend and the immediate next point where the induction signal crosses the reference in an upward trend, and verifying the existence of the object causing the induction by determining if the distance is greater than a threshold value.

According to one embodiment of the invention, the threshold value is the approximate width of a finger.

As described above, the method of this invention may also include receiving induction signals from other directions, determining the number of objects in these other directions and choosing the largest number among all directions as the number of objects.

Figure 4:
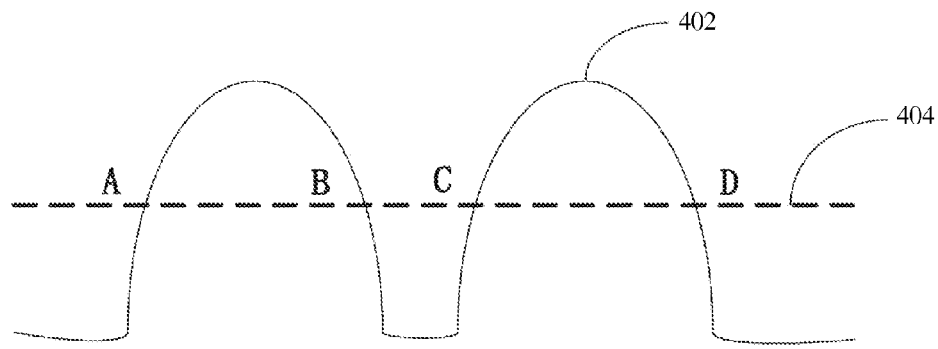
FIG. 4 illustrates a schematic diagram of the induction signal and the reference according to one exemplary embodiment of the present invention.

Referring to FIG. 4, signal 402 is an induction signal and 404 is the reference signal. The four points A, B, C and D are crossing points and can be used to determine the number of induction objects. Among them, A and C are upward crossing points, and B and D are downward crossing points. The existence of induction objects can be verified by comparing the distance between the two crossing points A and B with the threshold (or comparing the distance between the two points C and D with the threshold). If the distance is greater than the threshold, then there exists an induction object between points A and B (or C and D).

The reference signal 404 may be obtained by measuring, averaging and evaluating the induction caliber of the induction lines of the induction device in the X and Y directions. The induction device may be a capacitive touch device. The X and Y directions may not be perpendicular, they may be any angel according to the practical requirements of the induction device.

Figure 5:
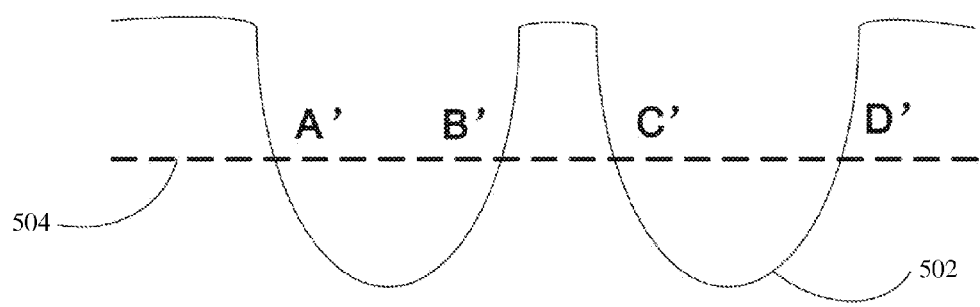
FIG. 5 illustrates a schematic diagram of the induction signal and the reference according to another exemplary embodiment of the present invention.

FIG. 5 shows another comparison between an induction signal and a reference signal according to one embodiment of the invention. In FIG. 5, signal 502 is an induction signal, 504 is the reference signal. The four points A', B', C' and D' are crossing points and can be used to determine the number of induction objects. The existence of induction objects can be verified by comparing the distance of the two points A' and B' with the threshold (or comparing the distance of the two points C' and D' with thee threshold). If the distance is greater than the threshold, then there exists an induction object between points A' and B' (or C' and D'). Please note that although FIG. 5 only provides the induction signal caused by two induction objects, it is understood that the same method can also be applied to induction signals caused by more objects.

Figure 6:
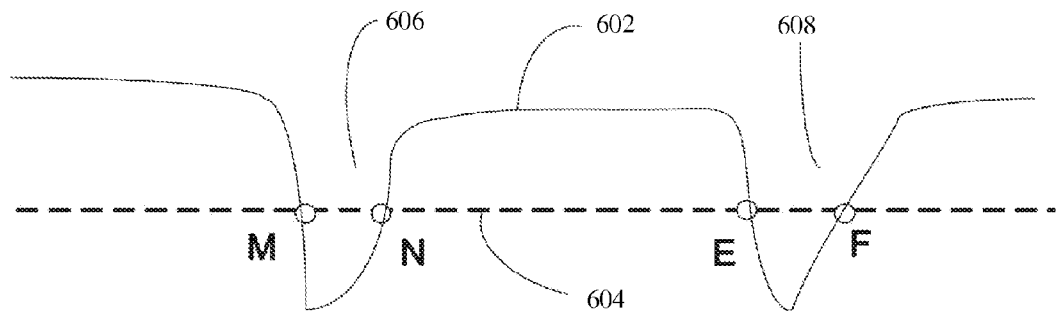
FIG. 6 illustrates a schematic diagram of the induction signal and the reference according to yet another exemplary embodiment of the present invention.

FIG. 6 shows the induction signal and reference signal received according to another embodiment of the invention. The induction signal is received from a receiver of acoustic touch device. Such a device has a signal transmitter and a signal receiver. The transmitter converts the electrical signal from the touch device to acoustic signal. The acoustic signal is reflected by the ultrasonic reflective stripes carved on the four sides of the touch device and received by the receiver. The receiver then converts it to electric signal. When an object touches the touch device, part of the acoustic energy that is being reflected is absorbed by the object and the acoustic signal received by the receiver is therefore changed. This changed signal is processed by the controller unit in the touch device and the induction signal is then obtained.

Referring to FIG. 6, signal 602 is an induction signal, 604 is the reference. The induction signal 602 is an acoustic wave signal. The induction signal 602 comprises two attenuation parts 606 and 608. The attenuation parts are generated because the energy in that part is absorbed when the object touches on a touch device. According to the method, the induction signal has two upward trends and two downward trends. The point M, N, E and F are crossing points and can be used to determine the number of induction objects. The existence of induction objects can be verified by comparing the distance between the two points M and N with the threshold (or comparing the distance between the two points E and F with the threshold) If the distance is greater than the threshold, then there exists an induction object between points M and N (or E and F).

In one exemplary embodiment, a device for detecting one or more objects on a touch device comprises: a detecting module configured to receive an induction signal inducted by a object; and a calculating module configured to compare the induction signal with a reference signal to detect at least one upward trend and/or at least one downward trend in the induction signal and determine the number of the objects based on the number of the upward trend and/or the downward trend in the induction signal. In one embodiment, the device further comprises an output module configured to output information of the number of the objects.

Figure 7:
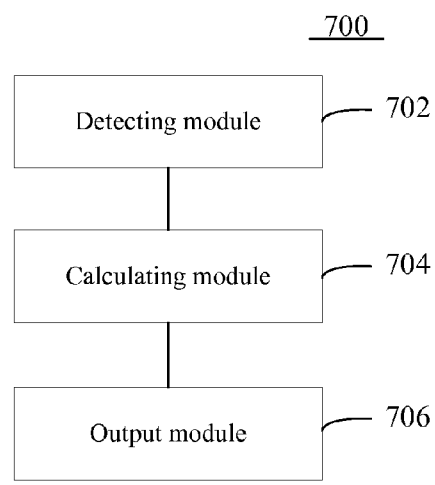
FIG. 7 illustrate a schematic diagram of a device for detecting one or more objects on a touch device according to one exemplary embodiment of the present invention.

Referring to FIG. 7, the device 700 comprises a detecting module 702 configured to detected an induction signal inducted by an object; a calculating module 704 connected to the detecting module 702 and configured to receive the induction signal and compare the induction signal with a reference signal to detect at least one upward trend and/or at least one downward trend in the induction signal and determine the number of the objects according to the number of the upward trend and/or the downward trend in the induction signal; and an output module 706 connected to the calculating module 704 and configured to output information of the number of the objects. In one embodiment, the detecting module 702 receives a first induction signal in a first direction and a second induction signal in a second direction inducted by an object and sends the first induction signal and the second signal to the calculating module 704. In one embodiment, the detecting module comprises: a transmitter configured to transmit an acoustic signal; and a receiver configured to receive the acoustic signal and converts it to a electric signal. In one embodiment, the calculating module is further configured to determine the number of the objects according to the number of the upward trend and/or the downward trend in the induction signal.

In one exemplary embodiment, the detecting module 702 is further configured to set a first and a second induction values. The first induction value and the second induction value is set according to the direction of the induction signal. For example, in FIG. 4 the direction of the induction signal is upward and in FIG. 5 the direction of the induction signal is downward. In this exemplary embodiment, if the the direction of the induction signal is upward, the first induction value is set less than the reference; if the direction of the induction signal is downward, the first induction value is set larger than the reference. In this exemplary embodiment, if the the direction of the induction signal is upward, the second induction value is set less than the reference; if the the direction of the induction signal is downward, the second induction value is set larger than the reference. In one exemplary embodiment, the calculating module 704 comprises a comparing unit. The comparing unit is configured to compare a present value of the induction signal with the reference to determine whether the the present value of the induction signal is greater than the reference; and determine 1) if the induction signal includes an upward trend, if the present value of the induction signal is greater than the reference and the previous value of the induction signal is no greater than the reference; or 2) if the induction signal includes a downward trend if the present value of the induction signal is no greater than the reference and the previous value of the induction signal is greater than the reference.

In one exemplary embodiment, the calculating module 704 is further configured to compare the reference with the first induction value; and detect an upward trend and/or a downward trend according to the comparison result of the reference and the first induction value and the comparison result of the initial value of the induction signal and the reference. In one exemplary embodiment, the calculating module 704 is further configured to compare the reference with a second induction value; and determine whether the induction signal includes an upward trend and/or a downward trend according to the comparison result of the reference and the second induction reference and the comparison result of the last value of the induction signal and the reference.

In one exemplary embodiment, the calculating module 704 is further configured to compare the distance between two adjacent crossing points of the induction signal; determine if the signal portion between the two adjacent crossing points is a valid induction signal portion and determine the number of objects according to the number of valid signal portions. For example, when the signal portion is above the reference, then the signal portion is valid if the distance between the upward crossing point and its adjacent downward crossing point is greater than the threshold.

In one embodiment, the detecting module 702 is configured to receive a first induction signal along a first direction and a second induction signal along a second direction. There is an angel between the first and second directions. Preferably, the angel is 90 degrees. The detecting module 502 is also configured to determine the number of touch objects according to the largest number of upward or downward trends in the first and second induction signals.

It will be appreciated by those skilled in the art that changes could be made to the examples described above without departing from the broad inventive concept. It is understood, therefore, that this invention is not limited to the particular examples disclosed, but it is intended to cover modifications within the spirit and scope of the present invention as defined by the appended claims.

What is claimed is:

1. A method for detecting one or more objects, comprising:
receiving one or more induction signals caused by at least one object along one or more directions in space;
identifying two or more values of the induction signal in one or more directions in space;
comparing each of the two or more values with a reference;
determining at least one upward trend and/or at least one downward trend in space if one of the two or more values is greater than the reference and another one of the two or more values is no greater than the reference; and
determining the number of objects based on the number of upward trends and/or downward trends in space in each received induction signal;
wherein the reference is obtained by measuring, averaging and evaluating an induction caliber of induction lines in one or more directions.

2. The method of claim 1, wherein the step of comparing further comprises the steps of:
comparing a present value of the induction signal with the reference to determine whether the present value of the induction signal is greater than the reference;
determining the induction signal includes a upward trend if the present value of the induction signal is greater than the reference and a previous value of the induction signal is no greater than the reference; or
determining the induction signal includes a downward trend if the present value of the induction signal is no greater than the reference and the previous value of the induction signal is greater than the reference.

3. The method of claim 2, further comprising:
setting a first induction value for a received induction signal;
comparing the reference with the first induction value; and
detecting an upward trend and/or a downward trend based on the comparison result of the reference and the first induction value.

4. The method of claim 2 or 3, further comprising:
setting a second induction value for a received induction signal;
comparing the reference with the second induction value; and determining whether the induction signal includes an upward trend and/or a downward trend based on the comparison result of the reference and the second induction value.

5. The method of claim 1, further comprising:
identifying the crossing points where an upward or downward trend crosses the reference;
determining if the distance between two adjacent crossing points is greater than a threshold value;
designating the signal portion between the two adjacent crossing points as a valid signal portion, if the distance is greater than the threshold value; and
determining the number of objects based on the number of valid signal portions.

6. The method of claim 1, wherein each induction signal is generated by a plurality of induction lines.

7. The method of claim 1, wherein the receiving step further comprises:
receiving a first induction signal along a first direction; and
receiving a second induction signal along a second direction.

8. The method of claim 7, wherein the determining step further comprises:
determining the number of objects based on the largest number of upward or downward trends in the first and second induction signals.

9. A method for detecting one or more objects on a touch device, comprising:
receiving one or more induction signals caused by at least one object along one or more directions in space on the touch panel of the touch device;
identifying two or more values of the induction signal in one or more directions in space;
comparing each of the two or more values with a reference;
determining at least one upward trend and/or at least one downward trend in space if one of the two or more values is greater than the reference and another one of the two or more values is no greater than the reference; and
determining the number of objects based on the number of upward trends and/or downward trends in space in each received induction signal;
wherein the reference is obtained by measuring, averaging and evaluating an induction caliber of induction lines in one or more directions.

10. The method of claim 9, wherein the step of comparing further comprises the steps of:
comparing a present value of the induction signal with the reference to determine whether the present value of the induction signal is greater than the reference;
determining the induction signal includes a upward trend if the present value of the induction signal is greater than the reference and a previous value of the induction signal is no greater than the reference; or
determining the induction signal includes a downward trend if the present value of the induction signal is no greater than the reference and the previous value of the induction signal is greater than the reference.

11. The method of claim 9, further comprising:
setting a first induction value for a received induction signal;
comparing the reference with the first induction value; and
detecting an upward trend and/or a downward trend based on the comparison result of the reference and the first induction value.

12. The method of claim 10 or 11, further comprising:
setting a second induction value for a received induction signal;
comparing the reference with the second induction value; and
determining whether the induction signal includes an upward trend and/or a downward trend based on the comparison result of the reference and the second induction value.

13. The method of claim 9, further comprising:
identifying the crossing points where an upward or downward trend crosses the reference;
determining if the distance between two adjacent crossing points is greater than a threshold value;
designating the signal portion between the two adjacent crossing points as a valid signal portion, if the distance is greater than the threshold value; and
determining the number of objects touched upon the touch device based on the number of valid signal portions.

14. The method of claim 9, wherein each induction signal is generated by a plurality of induction lines.

15. The method of claim 9, wherein each induction signal is generated by an acoustic receiver capable of converting acoustic signals to electric signals.

16. The method of claim 9, wherein the receiving step further comprises:
receiving a first induction signal along a first direction; and
receiving a second induction signal along a second direction.

17. The method of claim 16, wherein the determining step further comprises:
determining the number of objects based on the largest number of upward or downward trends in the first and second induction signals.

18. A device for detecting one or more objects on a touch device, comprising:
a detecting module, configured to detect one or more induction signals caused by at least one object along one or more directions in space on the touch panel of the touch device; and a calculating module, configured to receive the induction signal, identify two or more values of the induction signal in space, comparing each of the two or more values with a reference, determining at least one upward trend and/or at least one downward trend in space if one of the two or more values is greater than the reference and another one of the two or more values is no greater than the reference, and determine the number of objects based on the number of upward trends and/or downward trend in each received induction signal; wherein the reference is obtained by measuring, averaging and evaluating an induction caliber of induction lines in one or more directions.

19. The device of claim 18, further comprising an output module configured to output information of the number of objects.

20. The device of claim 18, wherein the calculating module is further configured to identify the crossing points where an upward or downward trend crosses the reference; determine if the distance between two adjacent crossing points is greater than a threshold value; designate the signal portion between the two adjacent crossing points as a valid signal portion, if the distance is greater than the threshold value; and determine the number of objects touched upon the touch device based on the number of valid signal portions.

21. The device of claim 18, wherein the detecting module comprises a plurality of induction lines configured to generate the induction signal.

22. The device of claim 18, wherein the detecting module further comprises:
a transmitter, configured to transmit an acoustic signal; and a receiver, configured to receive the acoustic signal transmitted by the transmitter;

wherein the receiver generates an induction signal based on the acoustic signal after the touch device is touched upon by an object.

23. The device of claim 18, wherein the detecting module is further configured to receive a first induction signal in a first direction and receive a second induction signal in a second direction.

24. The device of claim 23, wherein the calculating module is further configured to determine the number of objects based on the largest number of upward or downward trends in the first and second induction signals.

25. The device of claim 18, wherein the calculating module further comprises a comparing unit configured to compare values of the induction signal with the reference, determine if the induction signal includes an upward trend if the present value of the induction signal is greater than the reference and the previous value of the induction signal is no greater than the reference and determine if the induction signal includes a downward trend if the present value of the induction signal is no greater than the reference and the previous value of the induction signal is greater than the reference.

\* \* \* \* \*